US009124211B2

(12) United States Patent
Suzuki

(10) Patent No.: US 9,124,211 B2
(45) Date of Patent: Sep. 1, 2015

(54) ROTARY ELECTRIC MACHINE CONTROL APPARATUS

(71) Applicant: DENSO CORPORATION, Kariya, Aichi-pref. (JP)

(72) Inventor: Takashi Suzuki, Kariya (JP)

(73) Assignee: DENSO CORPORATION, Kariya (JP)

( * ) Notice: Subject to any disclaimer, the term of this patent is extended or adjusted under 35 U.S.C. 154(b) by 122 days.

(21) Appl. No.: 14/149,943

(22) Filed: Jan. 8, 2014

(65) Prior Publication Data

US 2014/0246997 A1   Sep. 4, 2014

(30) Foreign Application Priority Data

Mar. 4, 2013  (JP) .................................. 2013-41925

(51) Int. Cl.
| | |
|---|---|
| H02P 21/00 | (2006.01) |
| H02P 21/14 | (2006.01) |
| H02P 6/16 | (2006.01) |
| H02P 6/08 | (2006.01) |
| B62D 5/04 | (2006.01) |

(52) U.S. Cl.
CPC .............. *H02P 21/148* (2013.01); *B62D 5/046* (2013.01); *B62D 5/049* (2013.01); *H02P 6/085* (2013.01); *H02P 6/16* (2013.01); *H02P 21/146* (2013.01)

(58) Field of Classification Search
CPC ..... H02P 25/023; H02P 25/021; H02P 27/06; H02P 27/045; H02P 6/16
USPC ............ 318/400.02, 721, 700, 727, 799, 638, 318/437
See application file for complete search history.

(56) References Cited

U.S. PATENT DOCUMENTS

| | | | | |
|---|---|---|---|---|
| 7,746,023 | B2 * | 6/2010 | Ajima et al. ................... | 318/700 |
| 8,207,694 | B2 * | 6/2012 | Izumi et al. ............. | 318/400.04 |
| 8,487,563 | B2 * | 7/2013 | Kawakami et al. ...... | 318/400.13 |

(Continued)

FOREIGN PATENT DOCUMENTS

| | | |
|---|---|---|
| JP | 07-077102 | 3/1995 |
| JP | 09-149700 | 6/1997 |

(Continued)

OTHER PUBLICATIONS

Office Action (4 pages) dated Jan. 27, 2015, issued in corresponding Japanese Application No. 2013-041925 and English translation (4 pages).

*Primary Examiner* — Rita Leykin
(74) *Attorney, Agent, or Firm* — Nixon & Vanderhye PC

(57) ABSTRACT

A control unit of a rotary electric machine control apparatus includes a rotation position calculation section, which calculates a sensor angle by correcting a detection signal of a rotation position sensor based on correction value information specific to each sensor, and a correction value abnormality check section, which checks whether the correction value information is normal. When the correction value information is abnormal, the rotation angle calculation section corrects the detection signal of the rotation position sensor by using default value information in place of the correction value information. Each default value is limited to be different from the correction value within a predetermined range. A current command value calculation section sets a d-axis current command value to zero and fixes a current command phase to 90[°]. The current command phase is changed to be most remote from 0[°] and 180[°] thereby ensuring a tolerable range.

9 Claims, 17 Drawing Sheets

(56) References Cited

U.S. PATENT DOCUMENTS

| | | | |
|---|---|---|---|
| 8,796,963 B2 * | 8/2014 | Satou et al. | 318/400.04 |
| 2004/0003957 A1 | 1/2004 | Matsuoka et al. | |
| 2005/0285555 A1 | 12/2005 | Chen et al. | |
| 2007/0132423 A1 * | 6/2007 | Ajima et al. | 318/719 |
| 2008/0185983 A1 | 8/2008 | Suzuki | |
| 2010/0052581 A1 * | 3/2010 | Izumi et al. | 318/400.04 |
| 2010/0219780 A1 | 9/2010 | Morimoto et al. | |
| 2012/0078560 A1 | 3/2012 | Satou et al. | |

FOREIGN PATENT DOCUMENTS

| | | |
|---|---|---|
| JP | 10-328952 | 12/1998 |
| JP | 2002-095300 | 3/2002 |
| JP | 2002-325493 | 11/2002 |
| JP | 2005-337583 | 12/2005 |
| JP | 2007-336707 | 12/2007 |
| JP | 2008-017577 | 1/2008 |

* cited by examiner

ROTARY ELECTRIC MACHINE CONTROL APPARATUS

CROSS REFERENCE TO RELATED APPLICATION

This application is based on and incorporates herein by reference Japanese patent application No. 2013-41925 filed on Mar. 4, 2013.

FIELD

The present disclosure relates to a control apparatus for a rotary electric machine.

BACKGROUND

For controlling an AC rotary electric machine, feedback control and feedforward control are performed generally based on detection values of various physical quantities or calculation values and the like, which are calculated from the detection values. For controlling a motor, which is an AC rotary electric machine used in an electric power steering system of a vehicle to generate a steering assist torque, for example, an output torque of the motor is commanded based on a steering torque detected by a torque sensor and electric power supply to the motor is controlled to generate the command torque.

In this exemplary case, the actual torque detection value often deviates from a reference value because of an individual difference of each torque sensor and variations of a hardware circuit, to which the torque detection signal is inputted. According to an electric power steering system disclosed in JP 3933536 (patent document), driving of a motor is controlled by storing a correction value as correction value information for correcting a deviation of a torque detection value of a torque sensor from a reference value and correcting the torque detection value with the stored correction value information. When the correction value information is abnormal, the torque detection value is corrected with a predetermined value.

In the apparatus according to patent document, only the torque detection value is corrected. However, the physical quantities detected for controlling the motor include a rotation position of the motor and the like in addition to the torque detected by the torque sensor. Specifically, as the rotation position, rotation position information such as a mechanical angle, an electrical angle, an electrical angular velocity and a rotation speed is calculated based on a detection signal of a rotation position sensor and a control operation is performed by using these calculated values.

The detection signal of the rotation position sensor includes an initial error such as an assembling error of each rotation position sensor to a motor. The initial error may cause, depending on its value, the motor to generate torque of a different polarity from a command value. That is, the torque has a positive or negative polarity, which is opposite to that of the command. As a result, in the case that the motor is used in the electric power steering system, the motor is driven to generate assist torque in a direction opposite to the direction of steering operation of a driver. This gives feeling of strangeness to the driver.

SUMMARY

It is therefore an object to provide a rotary electric machine control apparatus, which prevents generation of torque of a polarity opposite to that of a command due to an initial error of assembling each rotation position detection device with a rotary electric machine, when correction value information is abnormal.

According to one aspect, a control apparatus for a rotary electric machine to which a rotation position sensor is assembled for detecting a rotation position of the rotary electric machine comprises a power converter for converting input power and supplying converted power to the rotary electric machine, and a control unit for controlling power supply to the rotary electric machine. The control unit includes a storage section, a rotation position calculation section, a correction value abnormality check section and a current command value calculation section.

The storage section stores correction value information and default value information. The correction value information is specific to individual assembly according to an initial error caused in assembling the rotation position sensor with the rotary electric machine. The default value information is limited so that a difference from the correction value information is within a predetermined range. The rotation position calculation section corrects a detection signal of the rotation position sensor by using the correction value information or the default value information stored in the storage section. The correction value abnormality check section checks whether the correction value information is normal. The current command value calculation section calculates a current command value of a magnetic field component current and a torque component current of the rotary electric machine.

When the correction value information is normal, the rotation position calculation section corrects the detection signal of the rotation position sensor based on the correction value information. When the correction value information is abnormal, the rotation position calculation section corrects the detection signal of the rotation position sensor based on the default value information, and the current command value calculation section calculates the current command value so that the magnetic field component current supplied to the rotary electric machine is closer to zero than when the correction value information is normal.

EMBODIMENT

Figure 1:
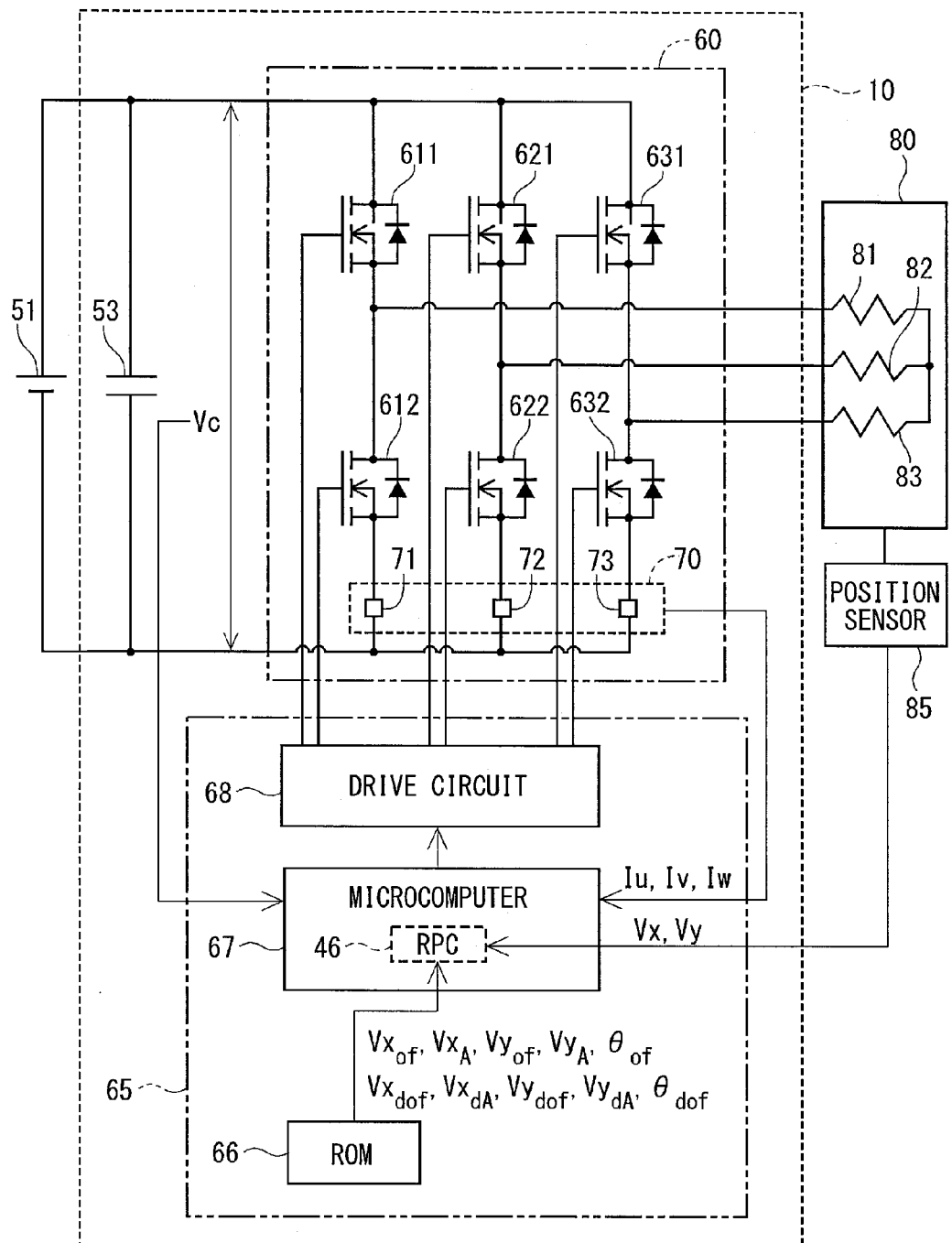
FIG. 1 is a circuit diagram of an AC rotary electric machine control apparatus according to first to third embodiments.

A rotary electric machine control apparatus will be described below with reference to plural embodiments shown in the accompanying drawings. The control apparatus is used in an electric power steering system of a vehicle as an example. In the following embodiments, substantially the same components are designated by same or similar reference numerals to simplify the description of such components.

First Embodiment

Figure 2:
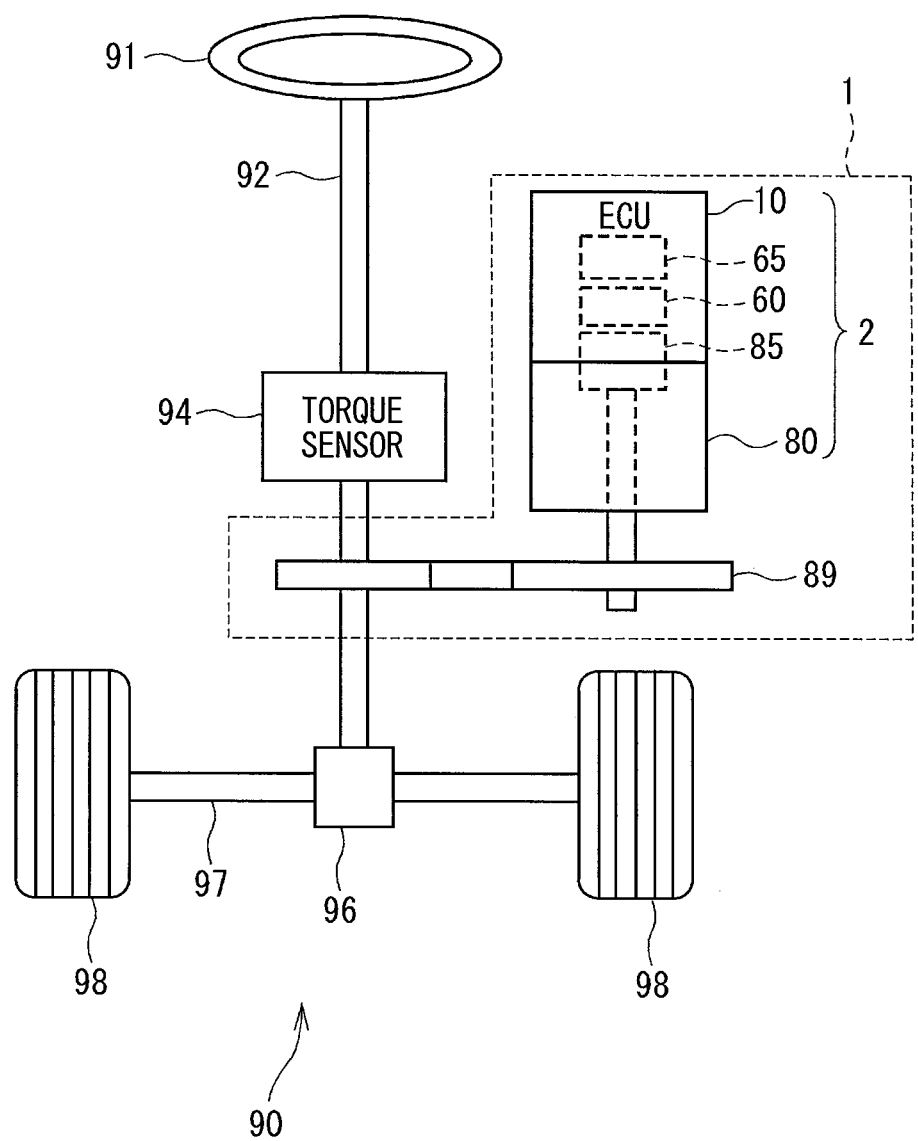
FIG. 2 is a schematic structural diagram of an electric power steering system, which uses the rotary electric machine control apparatus according to the first to the third embodiments.

Referring first to FIG. 1 and FIG. 2, an rotary electric machine control apparatus 10 is provided in an electric power steering system 1 of a steering system 90 of a vehicle. As shown in FIG. 2, a torque sensor 94 is provided on a steering shaft 92 coupled to a steering wheel 91 to detect a steering torque. A pinion gear 96 is provided at a top end of the steering shaft 92 and engaged with a rack shaft 97. A pair of tire wheels 98 is coupled rotatably to both ends of the rack shaft 97 via tie rods or the like. The rotary motion of the steering shaft 92 is converted to a linear movement of the rack shaft 97 by the pinion gear 96 so that the pair of tire wheels 98 are steered by an angle corresponding to a distance of the linear movement of the rack shaft 97.

The electric power steering system 1 includes an electric actuator 2 and a reduction gear 89. The actuator 2 rotates its rotary shaft. The reduction gear 89 transfers the rotation of the rotary shaft after reducing the rotation of the rotary shaft. The actuator 2 is formed of a motor 80 and an ECU 10. The motor 80 is an AC rotary electric machine, which generates a steering assist torque. The ECU 10 is provided as the rotary electric machine control apparatus, which controls driving of the motor 80. The motor 80 is a three-phase AC motor, which is a permanent magnet synchronous type and rotates the reduction gear 89 in a normal direction and a reverse direction.

A rotation position sensor 85 is for example a resolver. The rotation position sensor 85 is equivalent to a rotation angle sensor. The rotation position sensor 85 does not detect directly a rotation angle but, as described later with reference to FIG. 3, a rotation position calculation section 46 calculates a sensor angle θs based on a detection signal of the rotation position sensor 85. For this reason, it is referred to as a rotation position sensor.

As shown in FIG. 1 in detail, the ECU 10 includes a control unit 65 and an inverter 60, which is a power converter for controlling electric power supply to the motor 80 in response to control commands from the control unit 65. The control unit 65 controls outputs of the inverter 60 based on a rotation position detection signal of the rotation position sensor 85, a steering torque signal of the torque sensor 94 and the like. Thus, the actuator 2 of the electric power steering system 1 generates steering assist torque for assisting a steering operation of the steering wheel 91 and transferring the same to the steering shaft 92.

The motor 80 is formed of three coils 81, 82 and 83 of U-phase, V-phase, W-phase, respectively. The motor 80 is formed of a non-salient type SPM (surface permanent magnet) synchronous motor or a salient type IPM (interior permanent magnet) synchronous motor, which can generate reluctance torque.

The ECU 10 is formed of a smoothing capacitor 53, the inverter 60, the control unit 65 and the like. The inverter 60 converts DC power supplied from a battery 51 to three-phase AC power and supplies the AC power to the motor 80. The smoothing capacitor 53 is connected in parallel to the battery 51 at an input part of the inverter 60 so that a capacitor voltage Vc developed between electrodes of the smoothing capacitor 53 is supplied as an input voltage to the inverter 60. The smoothing capacitor 53 suppresses and smoothes ripples of the DC voltage inputted to the inverter 60. The smoothing capacitor 53 further suppresses noise components such as surge currents.

The inverter 60 includes six switching elements 611, 612, 621, 622, 631 and 632, which are connected in a bridge form to switch over power supply to the coils 81, 82 and 83 of the motor 80. Each of the switching elements 611 and the like is a MOSFET (metal-oxide semiconductor field-effect transistor). Each of the switching elements 611 to 632 is referred to as FET 611 to 632, respectively. Each of the FETs 611, 621 and 631 at a high-potential side (high-side arm) is referred to as a H-FET. Each of the FETs 612, 622 and 632 at a low-potential side (low-side arm) is referred to as a L-FET.

Drains of the H-FETs 611, 621 and 631 are connected to the high-potential side electrode of the battery 51. The sources of the H-FETs 611, 621 and 631 are connected to drains of the L-FETs 612, 622 and 632, respectively. Sources of the L-FETs 612, 622 and 623 are connected to the low-potential side electrode of the battery 51 through respective current detection elements 71, 72 and 73. Junctions between the H-FETs 611, 621 and 631 and the L-FETs 612, 622 and 632 are connected to one ends of the coils 81, 82 and 83, respectively. The current detection elements 71, 72 and 73 detect phase currents Iu, Iv and Iw supplied to the coils 81, 82 and 83, respectively.

The control unit 65 includes a ROM 66, which is a semiconductor memory, a microcomputer 67, a drive circuit 68 and the like. The ROM 66 stores therein correction values Vxof, VxA, Vyof, VyA as correction value information and default values Vxdof, VxdA, Vydof, VydA, θdof as default value information, which will be described in detail later. Although not shown, the ROM 66 may be a memory provided inside the microcomputer 67. The microcomputer 67 is inputted with the phase current values Iu, Iv and Iw detected by the current detector 70, rotation position signals Vx, Vy detected by the rotation position sensor 85, the capacitor voltage Vc and the like. The microcomputer 67 executes control calculation for driving the motor 80 based on those inputted signals. The drive circuit 68 is connected to gates of the FETs 611 to 632 and outputs switching outputs based on PWM drive signals outputted as control commands from the microcomputer 67.

Figure 3:
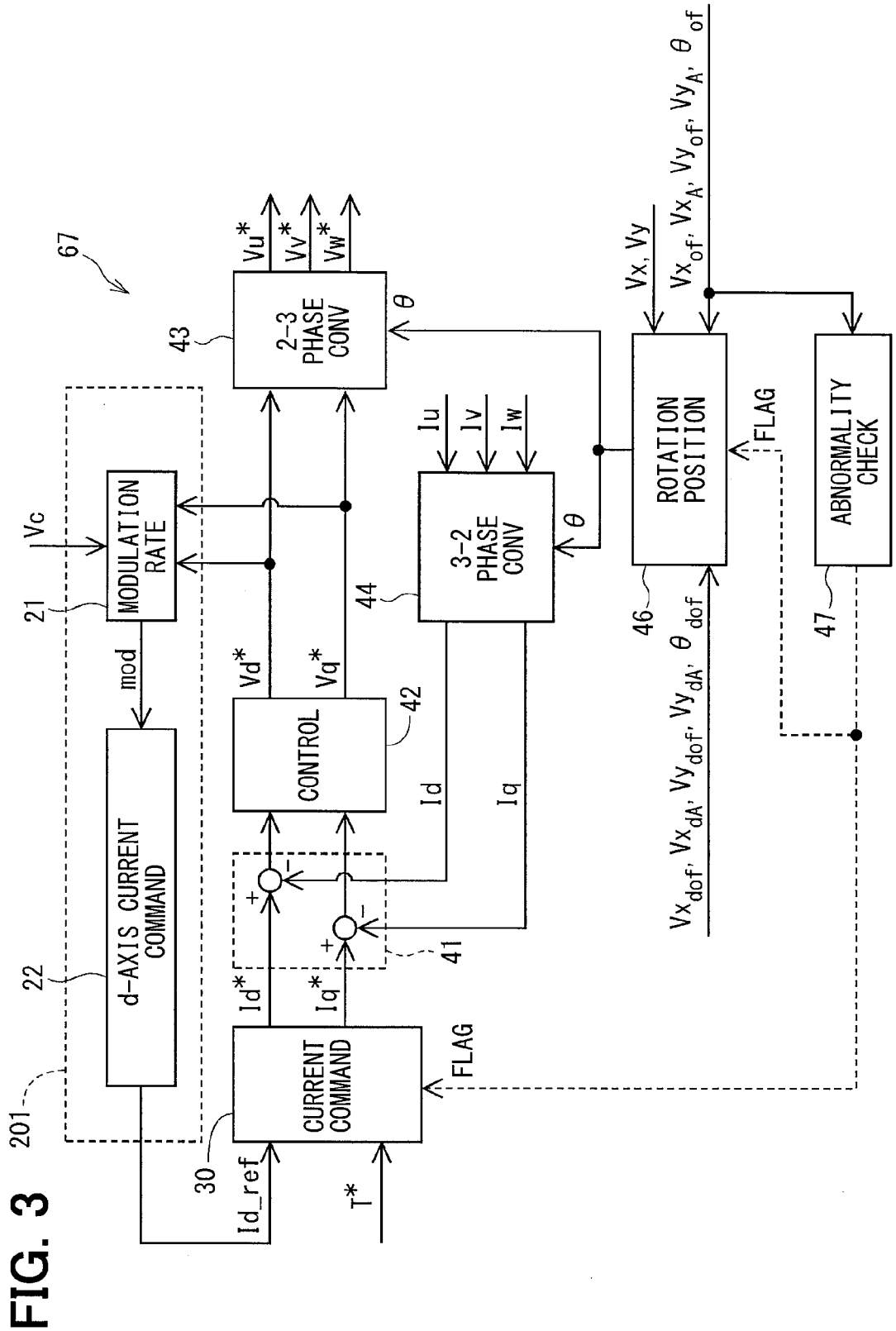
FIG. 3 is a control block diagram of the rotary electric machine control apparatus according to the first embodiment.

As shown in FIG. 3 in a control block diagram, the control unit 65 includes in its microcomputer 67 a d-axis current command reference value calculation section 201, a current command value calculation section 30, a subtraction section 41, a control section 42, a two-phase to three-phase (2-3 phase) conversion section 43, a three-phase to two-phase (3-2 phase) conversion section 44, a rotation position calculation section 46 and a correction value abnormality check section 47. These sections are parts of software processing executed by the microcomputer 67.

The d-axis current command reference value calculation section 201 calculates a d-axis current command reference value Id_ref, which is required for weak magnetic field control. The weak magnetic field control is for further accelerating rotation of the motor 80 with weakened magnetic field by decreasing a d-axis current in accordance with an electrical angular velocity of the motor 80. This control is required in particularly a high rotation area, in which counter-electromotive force increases. For this reason, the d-axis current command reference value calculation section 201 acquires information related to the electrical angular velocity of the motor 80 and determines the d-axis current command reference value Id_ref in correspondence to the acquired information. Since the d-axis current is zero or negative, decreasing the d-axis current corresponds to increasing an absolute value of the d-axis current in the negative direction. This is also true in the following description.

The d-axis current command reference value calculation section 201 is formed of a modulation rate calculation section 21 and a d-axis current command control section 22. The modulation rate calculation section 21 calculates a modulation rate mod, which is a rate of a voltage command amplitude Va relative to the capacitor voltage Vc. The modulation rate mod is calculated based on the capacitor voltage Vc, which is the input voltage to the inverter 60. The voltage command amplitude Va is calculated based on a d-q-axis voltage command values Vd* and Vq*. The modulation rate mod increases with an increase in the rotation speed of the motor 80. The d-axis current command control section 22 calculates the d-axis current command reference value Id_ref based on the modulation rate mod calculated by the modulation rate calculation section 21.

The current command value calculation section 30 is inputted with the d-axis current command reference value Id_ref from the d-axis current command reference value calculation section 201 and the torque command value T* and calculates a d-axis current command value Id* and a q-axis current command value Iq* based on those input values. Here, the d-axis current is a control current, which corresponds to a current of the magnetic field component of the motor 80, and the q-axis current is a control current, which corresponds to a torque component of the motor 80. The current command value calculation section 30 will be described in detail later.

The subtraction section 41 calculates differences between the d-axis current command value Id*, the q-axis current command value Iq*, which are commanded by the current command value calculation section 30, and a d-axis current detection value Id, a q-axis current detection value Iq, which are fed back by the three-phase to two-phase conversion section 44, respectively. The control section 42 calculates voltage command values Vd* and Vq* to converge those differences to zero. The control section 42, which corresponds to PI (proportional and integral) control calculation for example, calculates the voltage command values Vd* and Vq* based on a proportional gain and an integral gain.

The two-phase to three-phase conversion section 43 converts, based on the electrical angle θ outputted by the rotation position calculation section 46, the d-q-axis voltage command values Vd* and Vq* to three-phase voltage command values Vu*, Vv* and Vw* of the U-phase, the V-phase and W-phase. The three-phase to two-phase conversion section 44 converts, based on the electrical angle θ outputted by the rotation position calculation section 46, d-q converts the three-phase current detection values Iu, Iv and Iw detected by the current detector 70 and feeds back the d-axis current detection value Id and the q-axis current detection value Iq to the subtraction section 41.

The rotation position calculation section 46 calculates, based on the rotation position detection signals Vx and Vy, which are sensor outputs of the rotation position sensor 85, rotation position information of the motor 80, specifically a sensor angle θs, and outputs the sensor angle θs by converting to the electrical angle θ based on the number of pole pairs. The electrical angle θ outputted from the rotation position calculation section 46 is information, which is used for inverse d-q conversion and d-q conversion in the two-phase to three-phase conversion section 43 and the three-phase to two-phase conversion section 44, respectively. It is noted that, due to errors in assembling the motor 80 and the rotation position sensor 85 individually in the manufacturing process, the rotation position detection signal of the rotation position sensor 85 does not necessarily indicate the true rotation position. Therefore, a set of correction values Vxof, VxA, Vyof, VyA and θof are stored in the ROM 66 to correct an initial error such as an individual assembling error. The rotation position calculation section 46 corrects the rotation position detection signals Vx and Vy of the rotation position sensor 85 by using those correction values.

The microcomputer 67 further includes the correction value abnormality check section 47 in consideration of possibility of abnormality in the correction value set. The correction value abnormality check section 47 checks whether the correction value set (all correction values of the set) is normal. The correction value abnormality check section 47 outputs to the rotation position calculation section 46 and the current command value calculation section 30 a normality flag and an abnormality flag when the correction value set is normal and abnormal, respectively. The normality flag and the abnormality flag indicates that all correction values in the set is normal and any one of correction values in the set is abnormal, respectively.

The rotation position calculation section 46 uses a set of default values Vsdof, VxdA, Vydof, VydA and θdof stored in the ROM 66 in place of the set of correction values to correct the rotation position detection signals Vx and Vy, respectively, when the abnormality flag is acquired. The correction values Vxof, VxA, Vyof, VyA, θof and the default values Vxdof, VxdA, Vydof, VydA, θdof will be described in detail later. The processing of the current command value calculation section 30 in cases of the normality flag and the abnormality flag will be described later.

The operation of the ECU 10, particularly of the microcomputer 67, will be described with reference to FIG. 17A, FIG. 17B, FIG. 20A and FIG. 20B. The control unit 65, particularly the microcomputer 67, generates the three-phase voltage command values Vu*, Vv* and Vw* for the inverter 60 based on the information such as the torque command value T*, the capacitor voltage Vc, and the detection signals Vx and Vy of the rotation position sensor 85, and thereby controls the power supply to the motor 80. In particular, the phase currents Iu, Iv and Iw detected by the current detector 70 are converted into the d-axis and q-axis currents Id and Iq thereby to perform the current feedback control. The control unit 65 controls the current of the magnetic field component supplied to the motor 80 by controlling the d-axis current Id. The control unit 65 controls the current of the torque component supplied to the motor 80 by controlling the q-axis current.

Figure 17A:
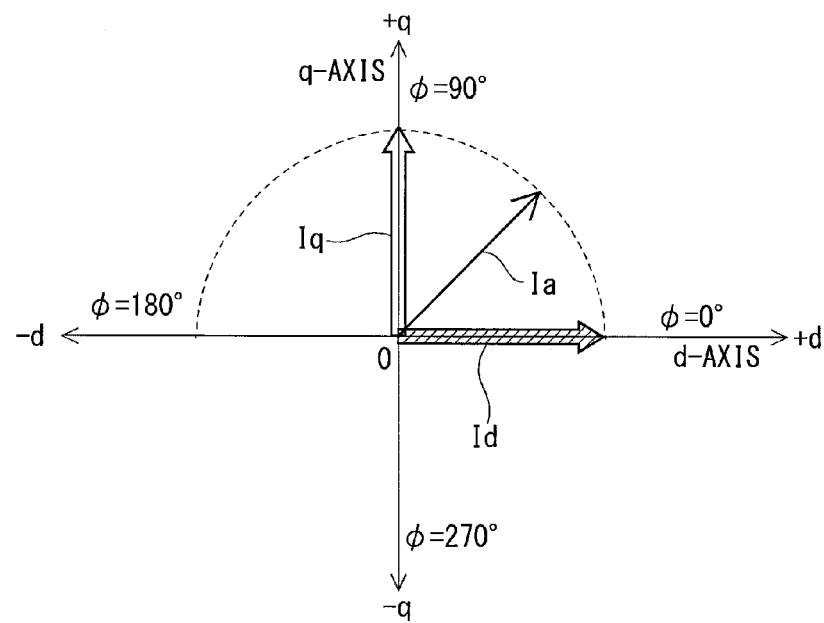
FIG. 17A and FIG. 17B are charts showing a current phase of a d-q current vector and a U-phase current, respectively.

As shown in FIG. 17A, the d-axis current Id and the q-axis current Iq are represented as a current vector on a coordinate of a d-axis and a q-axis (d-q coordinate). Assuming that the +d-axis is the reference of a current phase φ (φ=0[°]), the current phase of the current vector Id, the d-axis component of which is constant (fixed) and the q-axis component of which is zero, is 0[°]. Under the same assumption, the current phase of the current vector Iq, the q-axis component of which is constant (fixed) and the d-axis component of which is zero, is 0[°]. The amplitude Ia of the current indicated by a dotted circle in FIG. 17A is expressed by the following equation (1).

$$Ia = \sqrt{(Id^2 + Iq^2)} \quad (1)$$

Figure 17B:
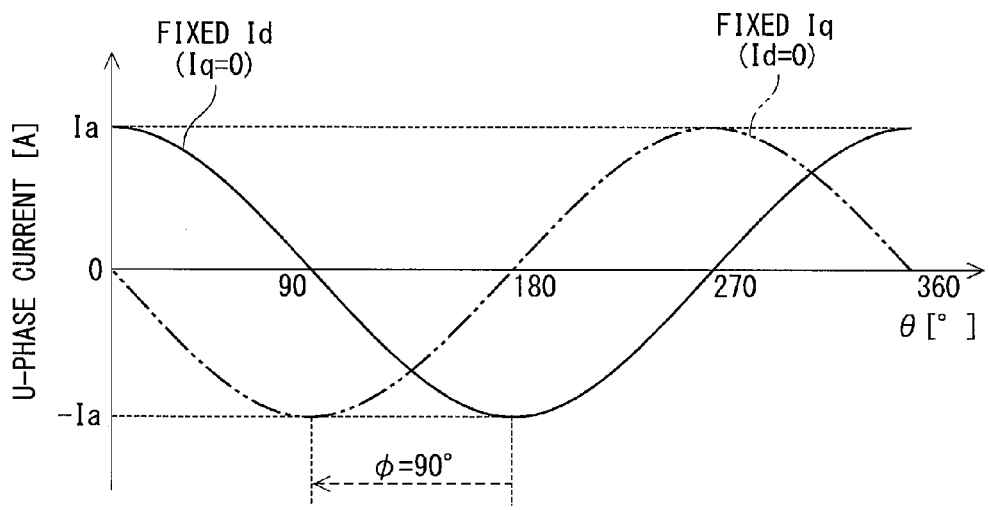

Taking up the U-phase current as a phase current as an example, the relation between the d-q-axis current vector and the U-phase current Iu is shown in FIG. 17B. Assuming that the current amplitude Ia is constant and the +d-axis overlaps the U-phase axis at the electrical angle θ=0[°], the U-phase current is expressed by the following equation (2.1).

$$Iu = Ia \times \cos(\theta + \varphi) \quad (2.1)$$

Assuming that the d-axis component is constant (=Ia), the q-axis component is zero and the current phase is φ=0[°], the current Iu is expressed by the following equation (2.2). Assuming that the q-axis component is constant (=Ia), the d-axis component is zero and the current phase is φ=0[°], the current Iu is expressed by the following equation (2.3).

$$Iu = \sqrt{(2/3)} \times Ia \times \cos(\theta) \quad (2.2)$$

$$Iu = \sqrt{(2/3)} \times Ia \times \cos(\theta + 90) \quad (2.3)$$

The relation between the current phase φ and the torque generated by the motor 80 will be described next with reference to FIG. 18 to FIG. 20A, FIG. 20B. Torque T of a motor is generally calculated by the following equation (3.1).

$$T = p \times \psi \times Iq + p \times (Ld - Lq) \times Id \times Iq \quad (3.1)$$

In this equation (3.1),
p: number of pole pairs of a motor
Ld and Lq: d-axis self-inductance and q-axis self-inductance
ψ: magnetic flux linkage of a permanent magnet armature
Here, since the self-inductances of a SPM synchronous motor are equal (Ld=Lq), the second term of the equation (3.1) is zero and the equation (3.1) is simplified as the equation (3.2).

$$T = p \times \psi \times Iq \quad (3.2)$$

On the other hand, since the self-inductances of a SPM synchronous motor are not equal (Ld≠Lq), the equation (3.1) is used.

Figure 18:
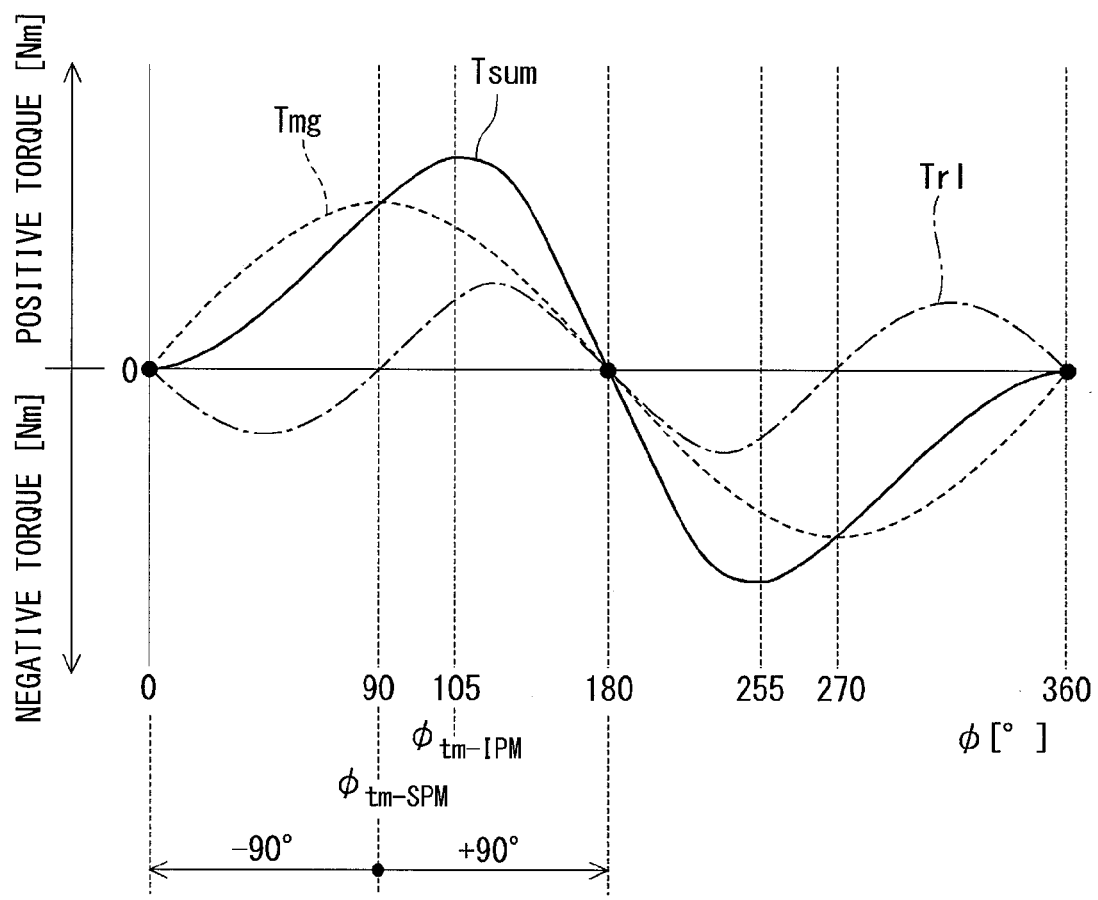
FIG. 18 is a chart showing a maximum torque phase of a SPM synchronous motor and an IPM synchronous motor.

The torque characteristic of the SPM synchronous motor corresponds to the magnet torque Tmg shown by a dotted line in FIG. 18 and the maximum torque phase φtm-SPM is 90[°]. FIG. 19B shows equal torque curves formed by connecting the d-axis current Id and the q-axis current Iq, which provide constant torques in the SPM synchronous motor. As understood from the equation (3.2) that the torque T is proportional to the q-axis current Iq, the equal torque characteristic lines Teq-S1, Teq-S2 and Teq-S3 are indicated as lines parallel to the d-axis. An area [I] indicated along the q-axis in the positive side of the q-axis indicates a maximum torque drive area, in which the motor is driven to provide a maximum torque with a minimum current.

The torque characteristic of the IPM synchronous motor indicates, as shown in FIG. 18, that the motor provides a total torque Tsum, which is a sum of a magnet torque Tmg and a reluctance torque Trl shown by a one-dot chain line. In FIG. 18, the maximum torque phase φtm-IPM is indicated at about 105[°]. As shown in FIG. 20B, the equal torque characteristic lines Teq-I1, Teq-I2 and Teq-I3 are indicated as curves, which rise in the right direction in correspondence to the equation (3.1). The maximum torque drive area [I] inclines in the negative side of the d-axis as the current increases. The maximum torque phase φtm-IPM varies with the magnitude of current. The maximum torque phase φtm-IPM, which is representative in FIG. 20B, corresponds to about 105[°].

In controlling the motor 80, maximum torque control, which generally uses the maximum torque drive area, and weak magnetic field control, which weakens the magnetic field in a high rotation area where the counter-electromotive force increases, are combined. As described above, the d-axis current command reference value calculation section 201 is provided to calculate the d-axis current command reference value Id_ref, which is appropriate for the weak magnetic field control.

Figure 19A:
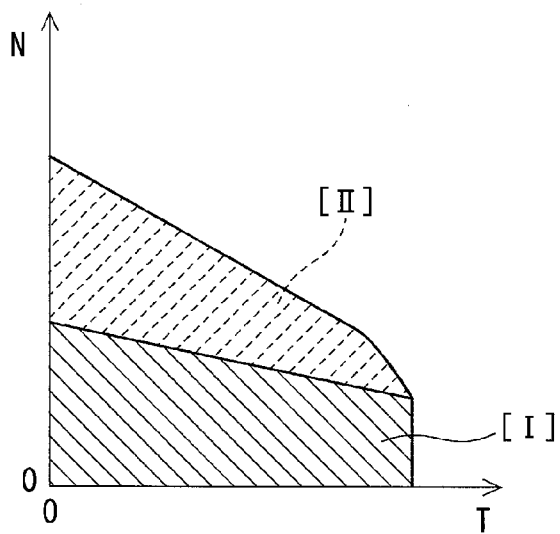
FIG. 19A and FIG. 19B are characteristic charts showing a relation between a torque and a rotation speed of the SPM synchronous motor and areas of weak magnetic field driving and maximum torque driving of the SPM synchronous motor, respectively.
Figure 19B:
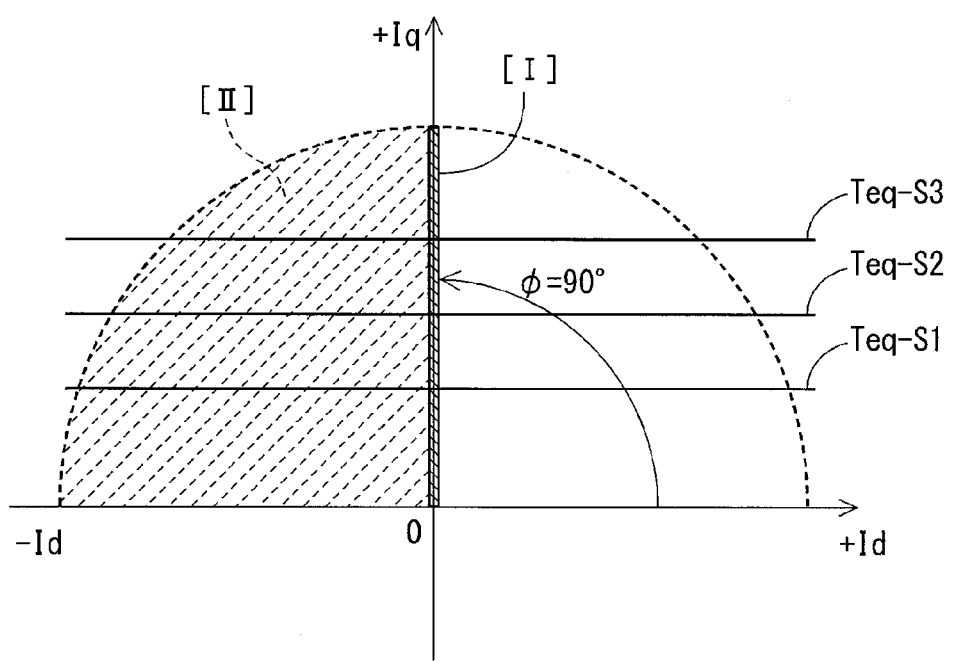
Figure 20A:
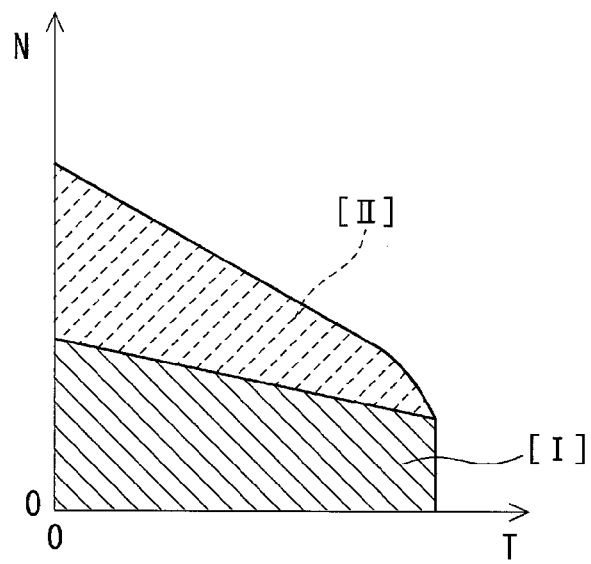
FIG. 20A and FIG. 20B are characteristic charts showing a relation between a torque and a rotation speed of the IPM synchronous motor and areas of weak magnetic field driving and maximum torque driving of the IPM synchronous motor.
Figure 20B:
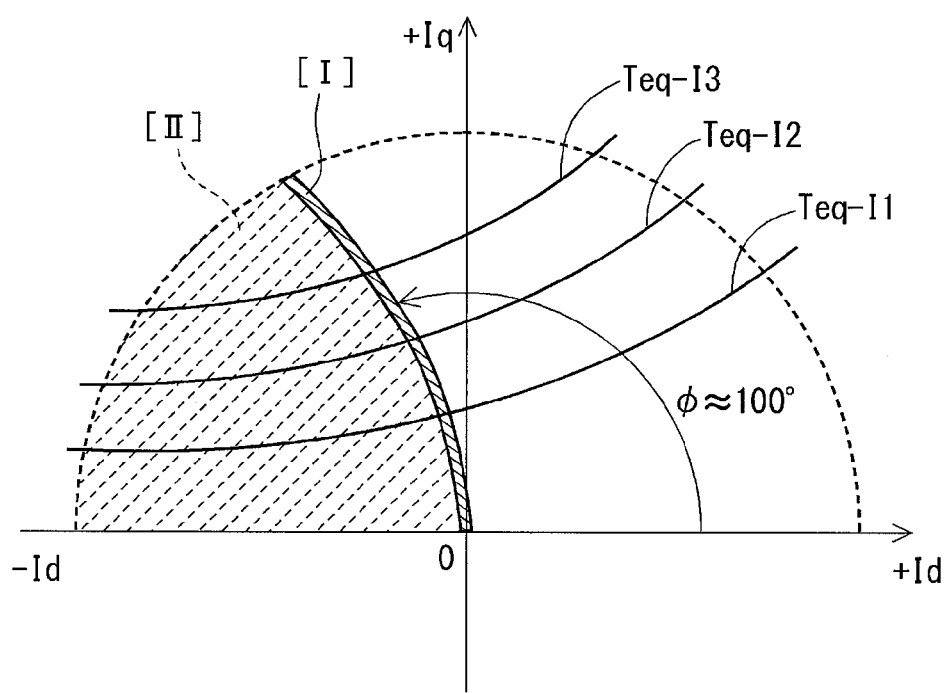

As shown in FIG. 19A and FIG. 20A, the maximum torque control and the weak magnetic field control are selected in common in both of the SPM synchronous motor and the IPM synchronous motor in accordance with the characteristic relation between the torque T and the rotation speed N. In the low rotation area, generally, the maximum torque control for providing the maximum torque with minimum current is performed by using the d-axis current Id and the q-axis current Iq in the maximum torque drive area [I] in FIG. 19A and FIG. 20A. In the high rotation area, generally, the weak magnetic field drive control is performed by using the d-axis current Id and the q-axis current Iq in the weak magnetic field drive area [II] in FIG. 19A and FIG. 20A. In both of the SPM synchronous motor and the IPM synchronous motor, the d-axis current Id is set to be smaller in the weak magnetic field control than in the maximum torque control. That is, the current phase φ is set larger than in the maximum torque control.

The above-described control is performed on an assumption that the information used in the calculation is acquired correctly. It is therefore necessary to avoid critical abnormality, which may arise because of various errors such as variations in actual products. Initial error in the rotation position detection signal, which is caused in assembling the rotation position sensor 85 and the motor 80, is considered. A correction value set specific to each assembly is stored individually in the ROM 66 based on the initial error caused in the manufacturing process. The rotation position calculation section 46 calculates the sensor angle θs by correcting the detection signals Vx and Vy of the rotation position sensor 85 with such correction values. Thus the control calculation is performed by using the corrected rotation position information.

However, the correction cannot be attained appropriately if the correction value set in the ROM 66 is abnormal. Therefore, the critical abnormality is prevented from arising even when the correction value set is abnormal. Here, as the critical abnormality, reversal of polarity of torque is considered as an example. If the polarity of torque is reversed, the motor 80 generates the torque, which is opposite in polarity to a command. In the electric power steering system, assist torque is generated in a direction opposite to a direction of steering of a driver. This should be avoided not to give feeling of strangeness to a driver.

Referring to FIG. 18, in each of the SPM synchronous motor and the IPM synchronous motor, the polarity of torque is reversed at the current phases of 0[°] and 180[°]. That is, in a range of the current phase φ between 0[°] and 180[°], the torque changes in magnitude but maintains the same polarity. In the following description, the range of the current phase φ is referred to as a tolerable range as long as the polarity of torque is the same. The tolerable range of the current phase φ is ensured as wide as possible as follows.

The configuration of the current command value calculation section 30 for solving the above-described problem will be described in detail with reference to a control program and a flowchart and the like shown in FIG. 4 to FIG. 11. The following description will be made with respect to applications to the SPM synchronous motor and the IPM synchronous motor. In the flowcharts, S means a step.

The current command value calculation section 30 is for ensuring the tolerable or allowable range of the current command phase φ for the d-axis and q-axis current command values Id* and Iq* as large as possible when the correction value set is abnormal. The section further performs the weak magnetic field control or the maximum torque control effectively in correspondence to the characteristic between the rotation speed N and the torque T shown in FIG. 19A and FIG. 20A.

[Current Command Value Calculation for SPM Synchronous Motor]

Figure 4:
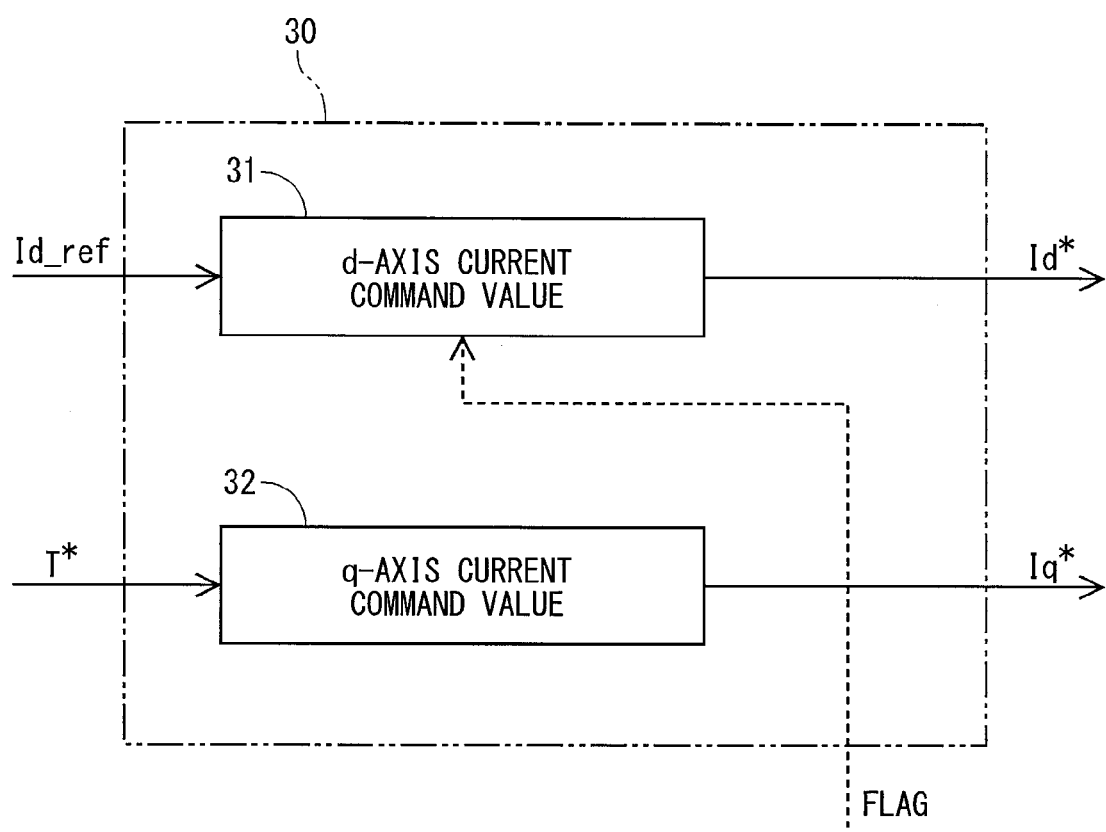
FIG. 4 is a control block diagram of a current command value calculation section in a case of application to a SPM synchronous motor.
Figure 6:
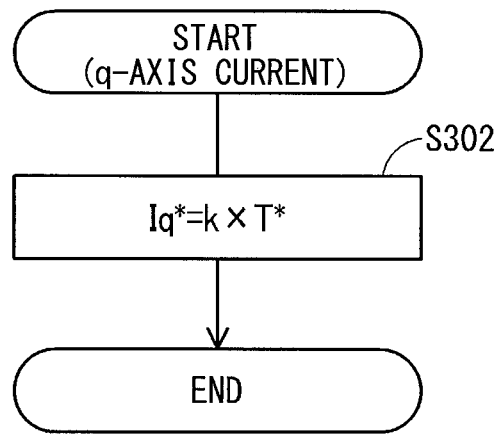
FIG. 6 is a flowchart of q-axis current command value calculation in a case of application to the SPM synchronous motor.
Figure 7:
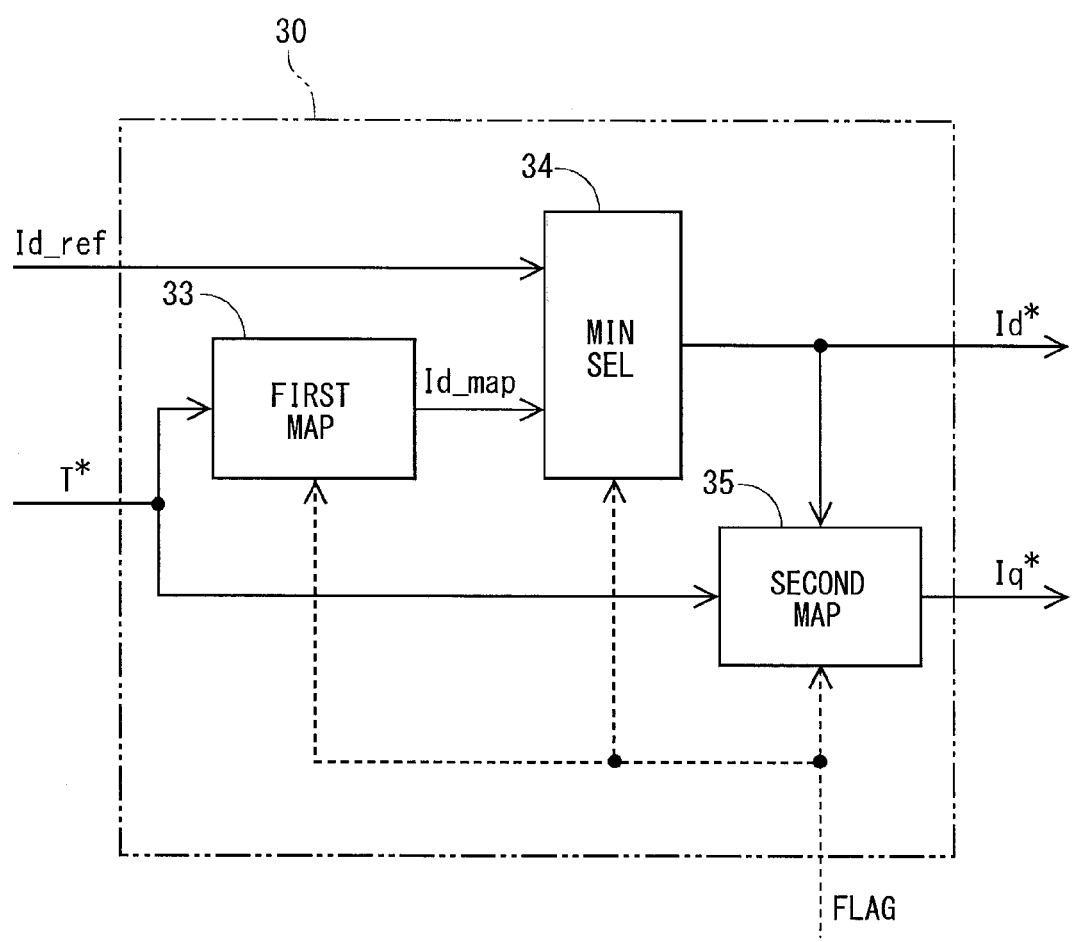
FIG. 7 is a control block diagram of a current command value calculation section in a case of application to an IPM synchronous motor.

The current command value calculation section 30 in case of the application to the SPM synchronous motor will be described in detail with reference to FIG. 6 and FIG. 7. As shown in FIG. 4, the current command value calculation section 30 includes a d-axis current command value calculation section 31 and a q-axis current command value calculation section 32. The d-axis current command value calculation section 31 is inputted with the d-axis current reference value Id_ref of the d-axis current command reference value calculation section 201 and the flag of the correction value abnormality check section 47. The q-axis current command value calculation section 32 is inputted with only the torque command value T*.

Figure 5:
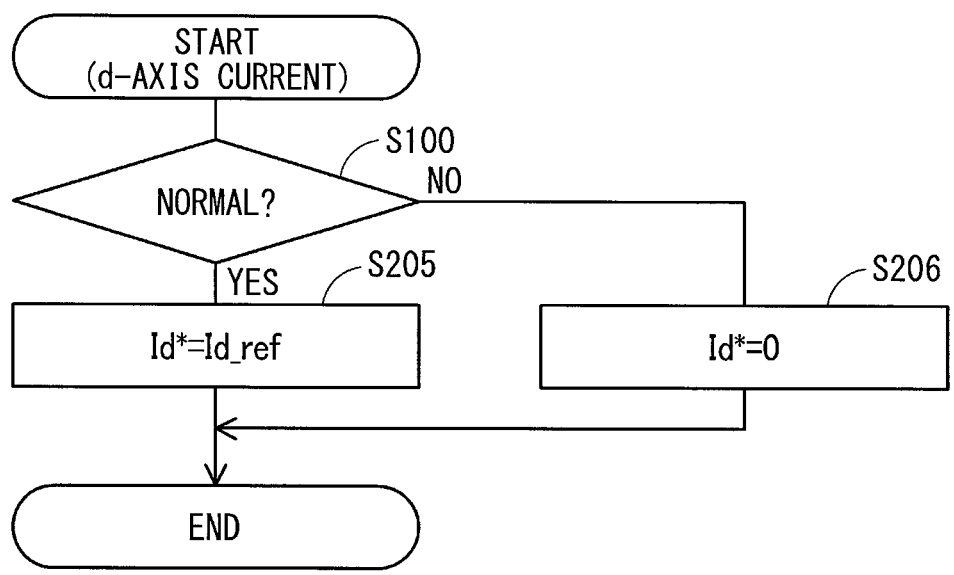
FIG. 5 is a flowchart of d-axis current command value calculation in a case of application to the SPM synchronous motor.

The operation of each section will be described assuming that the correction value set is normal. As shown in the flowchart of FIG. 5, the d-axis current command value calculation section 31 determines YES at S100, which checks whether the flag is normal, and sets the d-axis current command value Id* to be equal to the d-axis current command reference value Id_ref at S205. That is, the d-axis current command reference value Id_ref is used as the d-axis current command value Id* as it is. As shown in FIG. 6, the q-axis current command value calculation section 32 calculates the q-axis current command value Iq* proportional to the torque command value T* irrespective of the flag at S302. As a result, as far as the correction value set is normal, the d-axis current command value Id* and the q-axis current command value Iq* can be set to any one of the maximum torque drive area [I] and the weak magnetic field drive area [II] shown in FIG. 19B in correspondence to the d-axis current command reference value Id_ref. That is, the current command phase φ is between 90[°] and 180[°].

When the correction value set is abnormal, NO is outputted at S100, and the d-axis current command value Id* is set to zero at S206. The q-axis current command calculation section 32 calculates the q-axis current command value Iq* proportional to the torque command value T* at S302 similarly to the case that the correction value set is normal. As a result, when the correction value set is abnormal, the d-axis current command value Id* and the q-axis current command value Iq* are set in the maximum torque drive area [I] shown in FIG. 19B and the current command phase φ is 90[°]. That is, since the current command phase φ becomes most remote from the current phases 0[°] and 180[°], where the polarity of torque reverses between positive and negative, the tolerable area relative to the rotation position error becomes maximum.

[Current Command Value Calculation for IPM Synchronous Motor]

The configuration of the current command value calculation section 30 in case of the application to the IPM synchronous motor will be described in detail with reference to FIG. 7 to FIG. 11. As shown in FIG. 7, the current command value calculation section 30 includes a first data map 33 and a MIN current selection section 34 for calculating the d-axis current command value Id*. The current command value calculation section 30 further includes a second data map 35 for calculating the q-axis current command value Iq*. The first data map 33 and the second data map 35 are inputted with the torque command value T*. The MIN current selection section 34 is inputted with the d-axis current command reference value Id_ref of the d-axis current command reference value calculation section 201 and a d-axis current command data map value Id_data map outputted from the first data map 33. The first data map 33, the MIN current section 34 and the second data map 35 are inputted with the flag of the correction value abnormality check section 47.

Figure 8A:
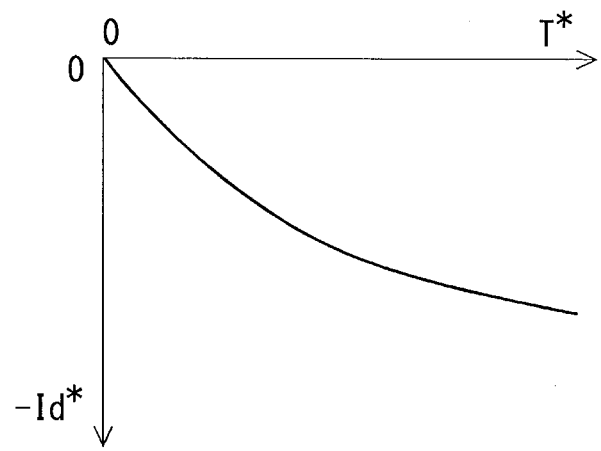
FIG. 8A and FIG. 8B are examples of a first data map and a second data map, respectively.
Figure 9:
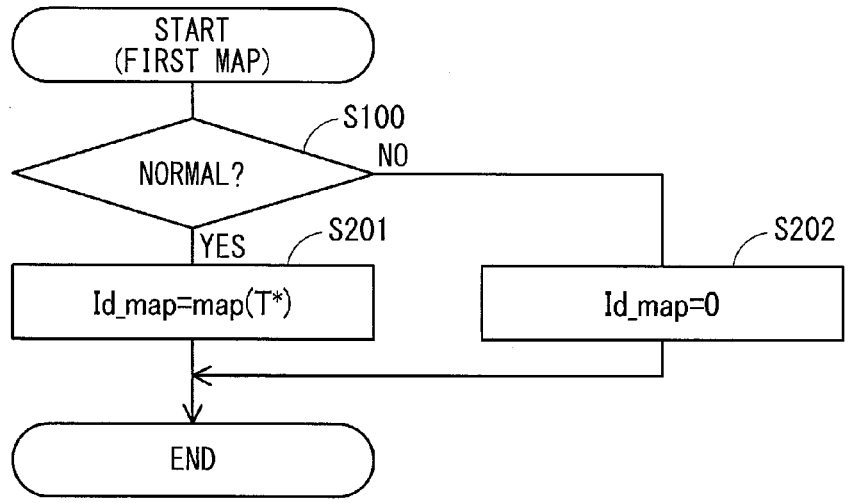
FIG. 9 is a flowchart for referring to the first data map by the current command value calculation section in a case of application to the IPM synchronous motor.
Figure 10:
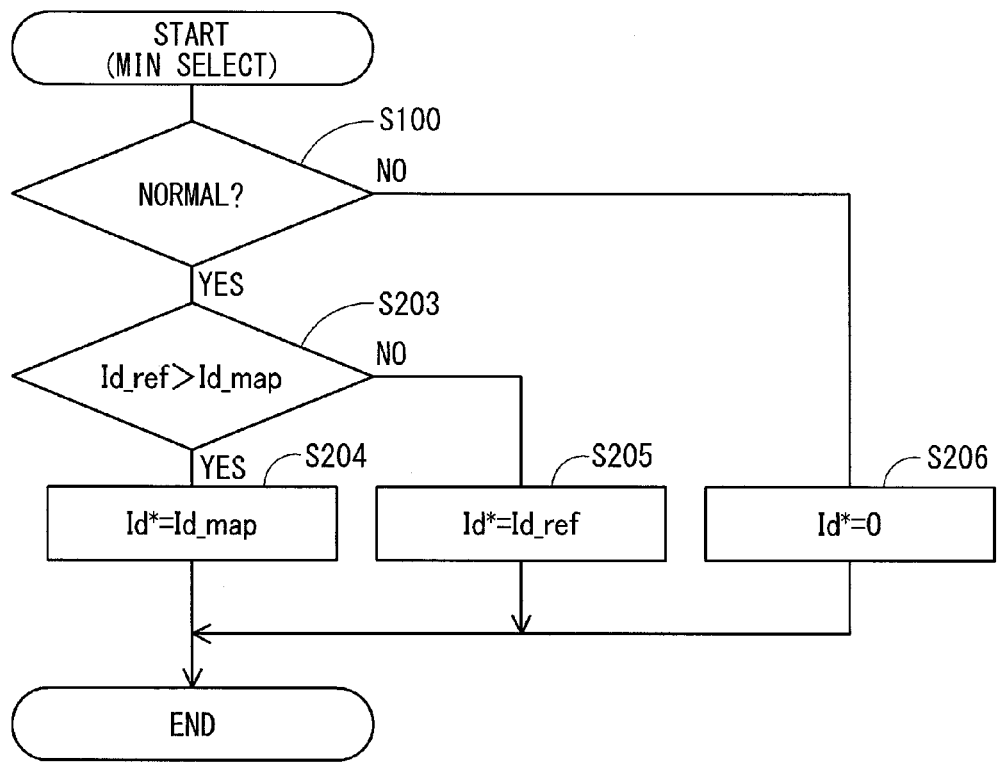
FIG. 10 is a flowchart of MIN current selection executed by the current command value calculation section in a case of application to the IPM synchronous motor.
Figure 11:
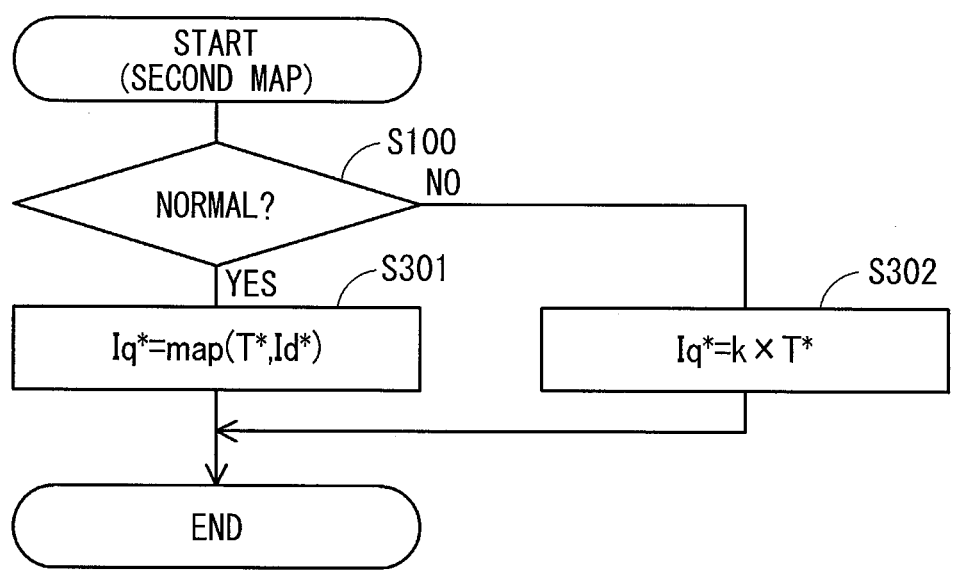
FIG. 11 is a flowchart for referring to the second data map by the current command value calculation section in a case of application to the IPM synchronous motor.

The operation of each section will be described assuming that the correction value set is normal. Here, the description refers to steps in the flowcharts of FIG. 9, FIG. 10 and FIG. 11. Those steps are executed when S100 for checking whether the flag is normal outputs YES. As shown in FIG. 8A, the first data map 33 defines a relation between a torque command value T* and a d-axis current command value Id* so that a maximum torque phase is attained in correspondence to the torque command value T*. As shown in FIG. 9, S201 determines the d-axis current command data map value Id_data map based on the torque command value T*.

Figure 8B:
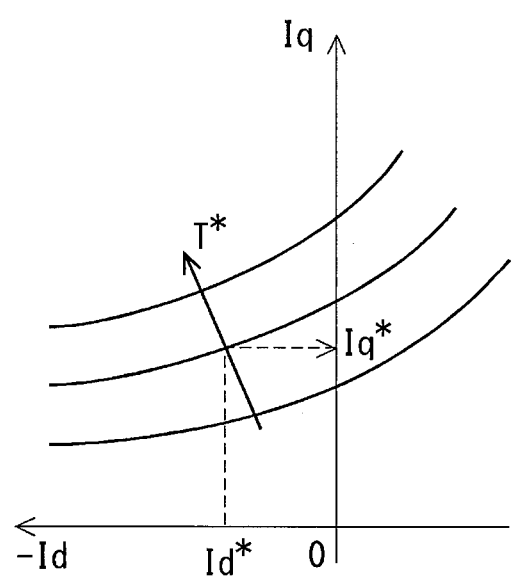

As shown in FIG. 8B, the second data map 35 is represented by equal torque characteristic lines on the d-q coordinate. On the equal torque characteristic line corresponding to the torque command value T*, one of the d-axis current command value Id* and the q-axis current command value Iq* is determined based on the other of the same. As shown at S301 in FIG. 11, the q-axis current command value Iq* is determined based on the torque command value T* and the d-axis current command value Id*.

The MIN current selection section 34 is inputted with the d-axis current command reference value Id_ref of the d-axis current command reference value calculation section 201 and the d-axis current command data map value Id_data map of the first data map 33. The MIN current selection section 34 selects the smallest one of the d-axis current command value among the inputted plural d-axis current command values.

That is, when the data map value Id_data map is smaller than the d-axis current command reference value Id_ref (S203: YES) in FIG. 10, the data map value Id_data map is selected as the d-axis current command value Id* (S204). When the d-axis current command reference value Id_ref is smaller than the data map value Id_data map (S203: NO), the d-axis current command reference value Id_ref is selected as the d-axis current command value Id* (S205). It is alternatively possible to input three or more d-axis current command values to the MIN current section 34 and select the smallest one of the d-axis current command values.

In a case that the data map value Id_data map is selected as the d-axis current command value Id*, the d-axis current command value Id* and the q-axis current command value Iq* can be set in the maximum torque drive area [I] shown in FIG. 20B. Thus, the current command phase φ is about 105[°]. In a case that the d-axis current command reference value Id_ref is selected as the d-axis current command value Id*, the d-axis current command value Id* and the q-axis current command value Iq* are set to the weak magnetic field drive area [II] shown in FIG. 20B. The current command phase φ is generally between 105[°] and 180[°].

The operation of each section will be described next assuming that the correction value set is abnormal. Here, in the flowcharts of FIG. 9, FIG. 10 and FIG. 11, steps which are executed when S100 determines NO are referred to. The first data map 33 sets the d-axis current command data map value Id_data map to zero at S202 in FIG. 9 without referring to the data map. The MIN current selection section 34 sets the d-axis current command value Id* to zero at S206 in FIG. 10 without comparing the d-axis current command reference value Id_ref with the data map value Id_data map. The second data map 35 calculates the q-axis current command value Iq* proportional to the torque command value T* at S302 in FIG. 11 without referring to the data map.

That is, when the correction value set is abnormal, the same control is performed as in the case of the control applied to the SPM synchronous motor. Thus the current command phase φ is 90[°], whether the synchronous motor is the IPM type or the SPM type. That is, since the current command phase φ becomes most remote from the current phases 0[°] and 180[°], where the polarity of torque reverses between positive and negative, the tolerable range relative to the rotation position error becomes maximum.

[Rotation Position Calculation and Correction Value Abnormality Check]

As shown in FIG. 1 and FIG. 3, the rotation position calculation section 46 acquires the rotation position detection signals Vx and Vy, which are the sensor outputs of the rotation position sensor 85, and the set of the correction values Vxof, VxA, Vyof, VyA, θof and the set of the default values Vxdof, VxdA, Vydof, VydA, θdo. The correction values and the default values are stored in the ROM 66 specifically to each assembly of a motor and a rotation position sensor. The rotation position calculation by the rotation position calculation section 46 will be described with reference FIG. 12A, FIG. 12B and FIG. 13.

Figure 12A:
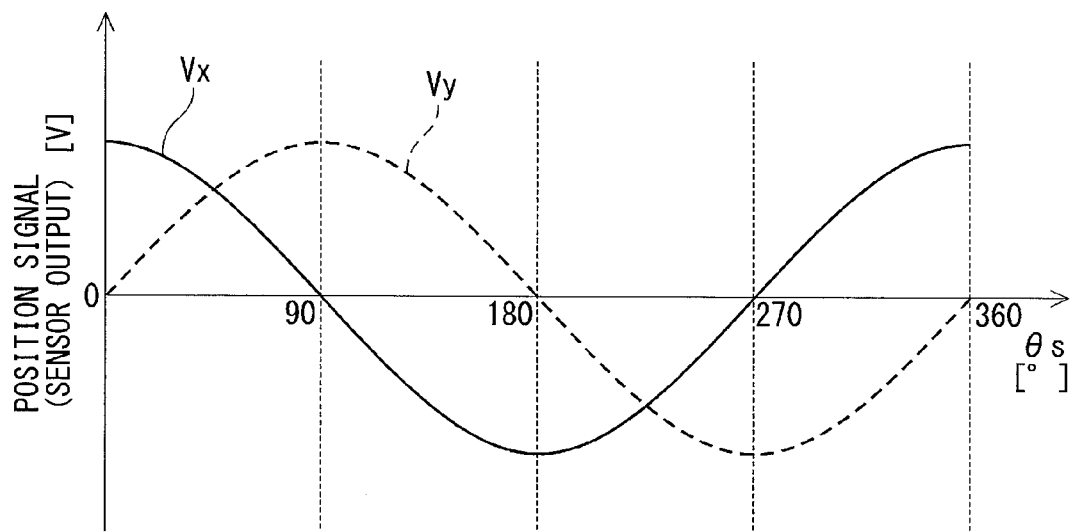
FIG. 12A and FIG. 12B are charts of a sensor output characteristic of a rotation position sensor and a correction value set.

As shown in FIG. 12A, the rotation position detection signal is formed of the cosine signal Vx and the sine signal Vy. One cycle of the cosine signal Vx and the sine signal Vy corresponds to the sensor angle 360[°].

The correction value set specific to individual assembly is for correcting the initial error, which is caused by erroneous assembling of the rotation position sensor 85 and the motor 80 in the manufacturing process. The correction values Vxof and Vyof are voltage offset correction values for the cosine signal Vx and the sine signal Vy, respectively. The correction values VxA and VyA are amplitude correction rates for the cosine signal Vx and the sine signal Vy, respectively. The correction value θof is the sensor angle offset correction value common for the cosine signal Vx and the sine signal Vy, respectively.

Figure 12B:
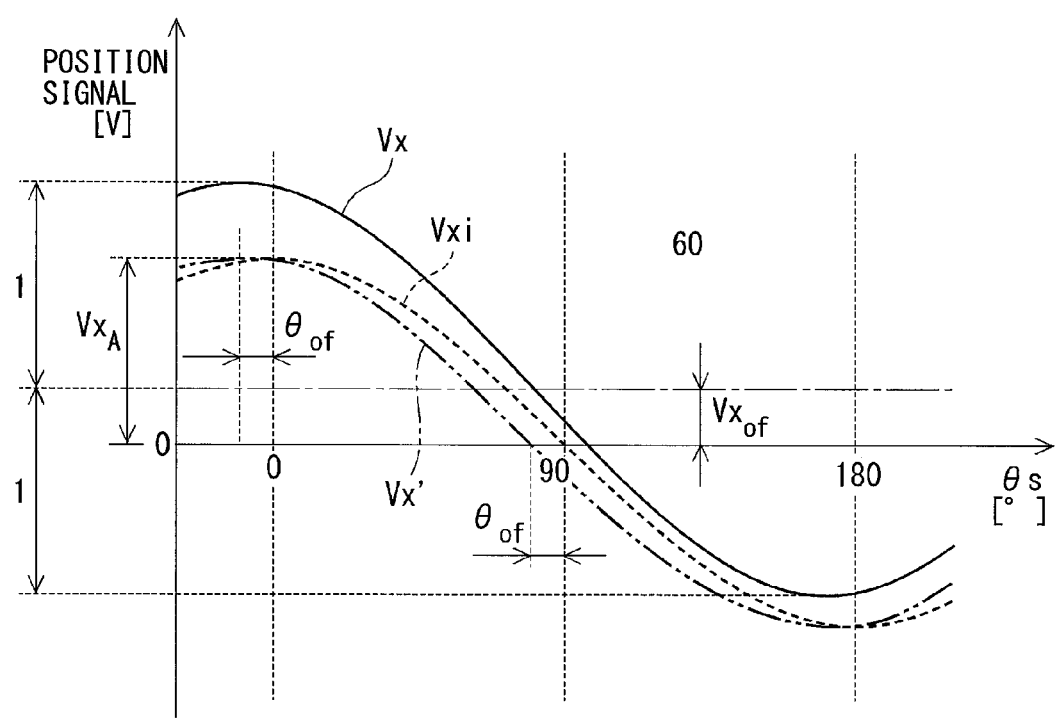

A deviation of a rotation position detection signal detected actually in a motor-sensor assembly, which has an initial error, from an ideal signal will be described about a cosine signal Vx as an example. In FIG. 12B, a solid line waveform indicates the cosine signal Vx detected actually and a dotted line waveform indicates the ideal cosine signal Vxi. The ideal cosine signal Vxi has a center of a voltage amplitude at 0[V]. The voltage amplitude is 0 at the sensor angle 90[°], maximum at the sensor angle 0[°] and minimum at the sensor angle 180[°]. The actual cosine signal Vx is offset from the ideal cosine signal Vxi so that the center of the voltage amplitude is offset by Vxof and the sensor angle θs is offset by θof. Assuming that the voltage amplitude of the actual cosine signal Vx is 1, the voltage amplitude of the ideal cosine signal Vx is VxA.

With respect to the initial error of the sine signal Vy, its voltage offset value Vyo and amplitude rate VyA are independent from those of the cosine signal Vx, and its sensor angle offset value θof is the same as that of the cosine signal Vx. Thus the deviation between the actual detection signal and the ideal signal is evaluated individually at the initial inspection in the manufacturing process and a set of five correction values, which are the voltage offse correction values Vxof, Vyof, the amplitude correction rate VxA, VyA and the sensor angle offset correction value θof, are stored in the ROM 66.

Figure 13:
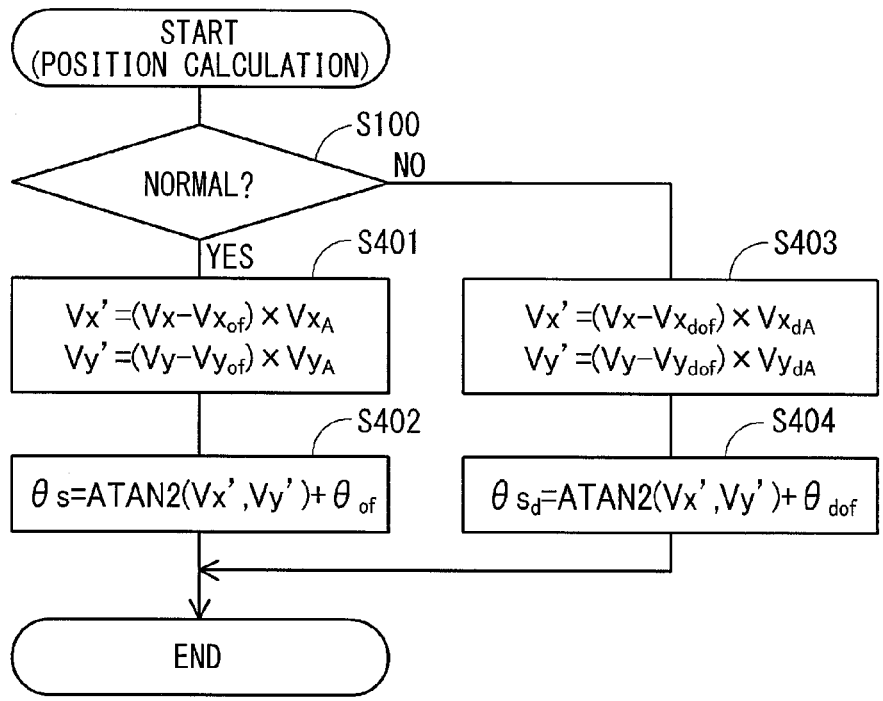
FIG. 13 is a flowchart of rotation position calculation performed by a rotation position calculation section in the first embodiment.

The rotation position calculation section 46 then corrects the cosine signal Vx and the sine signal Vy acquired from the rotation position sensor 85 according to the flowchart shown in FIG. 13. If the correction value set is normal, the correction values in the set are used. If the correction value set is abnormal, the default values are used in place of the correction values in the set.

At S100 in FIG. 13, it is checked whether the flag determined by the correction value abnormality check section 47 indicates normality. When the correction value set is normal (S100: YES), a cosine signal Vx' and a sine signal Vy' are calculated by correcting the voltage offset and the voltage amplitude according to the following equations (4.1) and (4.2) at S401.

$$Vx' = (Vx - Vxof) \times VxA \quad (4.1)$$

$$Vy' = (Vy - Vyof) \times VyA \quad (4.2)$$

At S402, the sensor angle θs is calculated based on the cosine signal Vx', sine signal Vy' and the sensor angle offset correction value θof according to following equation (4.3).

$$\theta s = A\ \text{TAN}\ 2(Vx', Vy') + \theta of \quad (4.3)$$

Assuming that θat=A TAN 2(Vx', Vy'), the angle θat is defined as in the following table in correspondence to ranges of Vx' and Vy'. In the table, α=(Vy'/Vx') and −90<arctan α<90.

TABLE

| Vx' | Vy' | θat ([°]) | θat Range |
|---|---|---|---|
| Vx' > 0 | Vy' ≥ 0 | θat = arctan α | 0 ≤ θat < 90 |
| Vx' = 0 | Vy' > 0 | θat = 90 | |
| Vx' < 0 | Vy' ≥ 0 | θat = arctan α + 180 | 90 < θat ≤ 180 |
| Vx' < 0 | Vy' < 0 | θat = arctan α − 180 | −180 < θat < −90 |
| Vx' = 0 | Vy' < 0 | θat = −90 | |
| Vx' > 0 | Vy' < 0 | θat = arctan α | −90 < θat < 0 |

When the correction value set is abnormal (S100: NO), the sensor angle θsd is calculated according to the equations, which correspond to the equations (4.1) to (4.3), by using the default value set Vxdof, VxdA, Vydof, VydA and θdof at S403 and S404. Each of the default values is set to a center value or the like of variations in the correction values among individual assemblies and the deviations from the individual correction values are limited to be within a predetermine range. That is, if the difference between the correction value and the default value is not within the predetermined range in the check process at the time of manufacture, such an individual assembly is eliminated as being unacceptable. The value of the sensor angle θsd determined based on the default value is thus limited such that the deviation from the sensor angle θs determined by the correction value is within the predetermined range. The rotation position calculation section 46 converts the sensor angle θs determined based on the correction value or the sensor angle θsd determined based on the default value to the electrical angle θ based on the magnetic pole pairs and outputs it.

Next, the correction value abnormality check section 47 related to the abnormality check of the correction value set will be described with reference to the flowchart shown in FIG. 14. In this check processing, the correction value set is determined to be abnormal, if any one of the correction values Vxof, VxA, Vyof, VyA and θof is outside the predetermined range. At S501, "upth" following the end of symbol of each correction value indicates an upper (up-side) limit threshold value and "dnth" of the same indicates a lower (down-side) limit threshold value. At S501, it is checked whether each of the correction values Vxof, VxA, Vyof, VyA and θof is larger than the lower limit threshold value and smaller than the upper limit threshold value, that is, it is within a predetermined range. If all of the correction values Vxof, VxA, Vyof, VyA and θof are within the respective predetermined ranges, that is, check result is YES, the flag is set to normality at S101. If any one of the correction values Vxof, VxA, Vyof, VyA and θof is outside its predetermined range, that is, the check result is NO, the flag is set to abnormality at S102.

(Advantage)

The first embodiment described above provides the following advantages.

(1) The rotation position calculation section 46 calculates, when the correction value set of Vxof, VxA, Vyof, VyA and θof, which are stored in the ROM 66 specifically to individual moor-sensor assembly, is normal, the sensor angle θs by correcting the detection signals Vx and Vy of the rotation position sensor 85 with the set of correction values. The two-phase to three-phase conversion section 43 and the three-phase to two-phase conversion section 44 can perform the control calculation of the inverse d-q conversion and the d-q conversion by using the electrical angle θ, which is the conversion of the corrected appropriate sensor angle θs. It is of course possible to prevent the torque of polarity, which is different from the command, from arising.

(2) The ECU 10 includes the correction value abnormality check section 47, which checks whether the correction value set of Vxof, VxA, Vyof, VyA and θof are normal. When the correction value set is determined to be abnormal, the rotation position calculation section 46 corrects the detection signals Vx and Vy of the rotation position sensor 85 by using the default value set of Vxdof, VxdA, Vydof, VydA and θdof in place of the correction value set, and calculates the sensor angle θsd. This default value is limited such that its difference from the correction value specific to each assembly is within the predetermined range. Hence the value of the sensor angle θsd determined based on the default value is limited such that its difference from the sensor angle θs determined based on the original correction value is within the predetermined range.

(3) The current command value calculation section 30 sets the d-axis current command value Id* to zero and fixes the current command phase φ to 90[°], when the correction value set is abnormal. Thus the current command phase φ is set to be most remote from the current phases 0[°] and 180[°], where the polarity of torque is reversed. The tolerable range of the current command phase can be set as wide as possible. In combination with the use of the default values described above (2), it is possible to prevent torque from being generated in the polarity opposite to the command.

(4) The current command value calculation section 30 calculates the q-axis current command value Iq* based on the torque command value T*, when the correction value set is abnormal. As a result, appropriate torque can be generated.

JP-A-2002-325493 discloses a motor control apparatus, which stores an angular deviation amount caused in assembling an angle sensor and corrects a detection angle of the angle sensor with the stored angular deviation amount. It however fails to disclose any processing in a case that the correction value of the angular deviation amount becomes abnormal. The present embodiment has the specific configuration to counter the case that the correction value is abnormal, and hence can provide the advantages of (3) and (4).

(5) The current command value calculation section 30 has the configuration of calculation of the d-axis current command value Id* and the q-axis current command value Iq* in consideration of the weak magnetic field control and the maximum torque control based on whether the motor 80 is the SPM synchronous motor or the IPM synchronous motor, when the correction value set is normal. Thus, when the correction value set is normal, the motor 80 can be driven efficiently.

Second Embodiment

Figure 15:
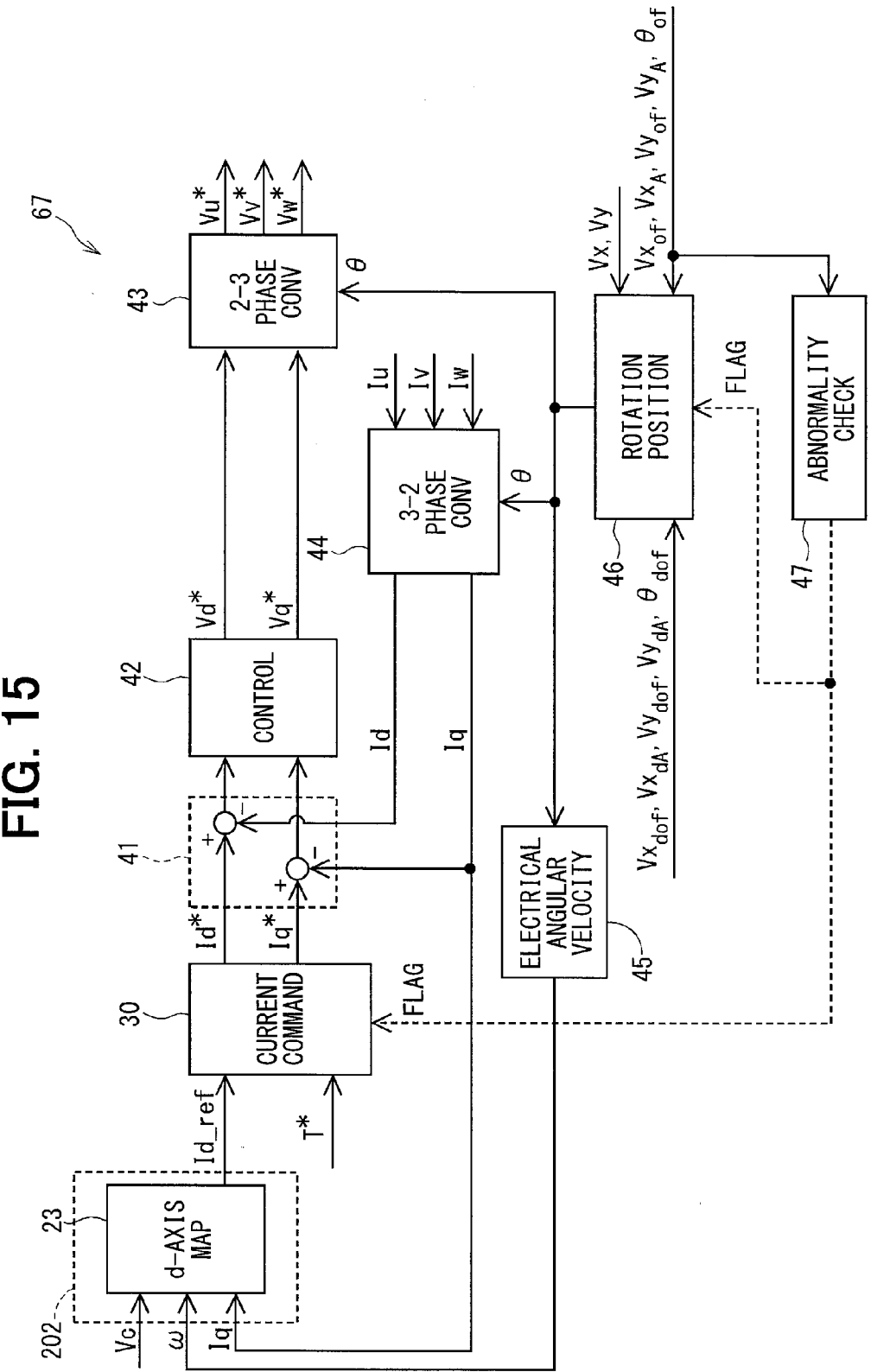
FIG. 15 is a control block diagram of an AC rotary electric machine control apparatus according to a second embodiment.

According to a second embodiment shown in FIG. 15, a d-axis current command reference value calculation section 202 is provided in the microcomputer 67 of the control unit 65 in place of the section 201 of the first embodiment shown in FIG. 3. The d-axis current command reference value calculation section 202 is inputted with the capacitor voltage Vc, an electrical angular velocity w calculated from an electrical angle θ by an electrical angular velocity calculation section 45 and the q-axis current detection value Iq calculated by the three-phase to two-phase conversion section 44. The d-axis current command reference value calculation section 202 calculates the d-axis current command reference value Id_ref suitable for the weak magnetic field control based on the capacitor voltage Vc, the electrical angular velocity w and the q-axis current detection value Iq with reference to a d-axis current command reference value data map 23.

This d-axis current command reference value Id_ref is inputted to the current command value calculation section 30 so that the d-axis current value Id* and the q-axis current command value Iq* are calculated in the similar manner as in the first embodiment. The current command value calculation section 30 is configured as shown in FIG. 4 and FIG. 7 in cases of application to the SPM synchronous motor and the IPM synchronous motor, respectively.

For example, when the correction value set are normal in the case of the IPM synchronous motor, the d-axis current command value Id* is determined by selecting a smaller one of the d-axis current command reference value Id_ref, which is calculated by the d-axis current command reference value calculation section 202 and suitable for the weak magnetic field control, and the d-axis current command data map value Id_data map, which reflects the maximum torque characteristic determined with reference to the first data map 33 based on the torque command value T*.

On the contrary, when the correction value is abnormal in the case of the IPM synchronous motor, the current command value calculation section 30 uses none of the d-axis current command reference value Id_ref and the data map value Id_data map. The current command value calculation section 30 instead sets the d-axis current command value Id* to zero and calculates the q-axis current command value Iq* by referring to the second data map 35 based on the torque command value T*. Thus second embodiment also provides the similar advantages (1) to (5) of the first embodiment.

Third Embodiment

Figure 14:
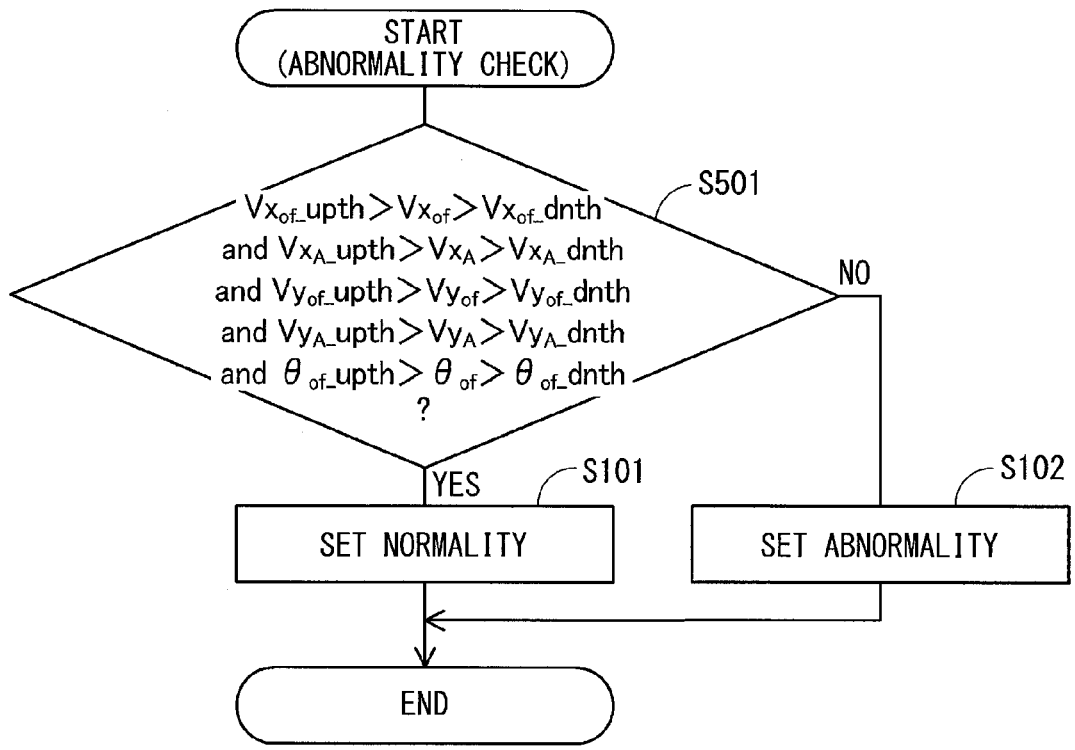
FIG. 14 is a flowchart of correction value abnormality checking performed by a correction value abnormality checking section in the first embodiment.
Figure 16:
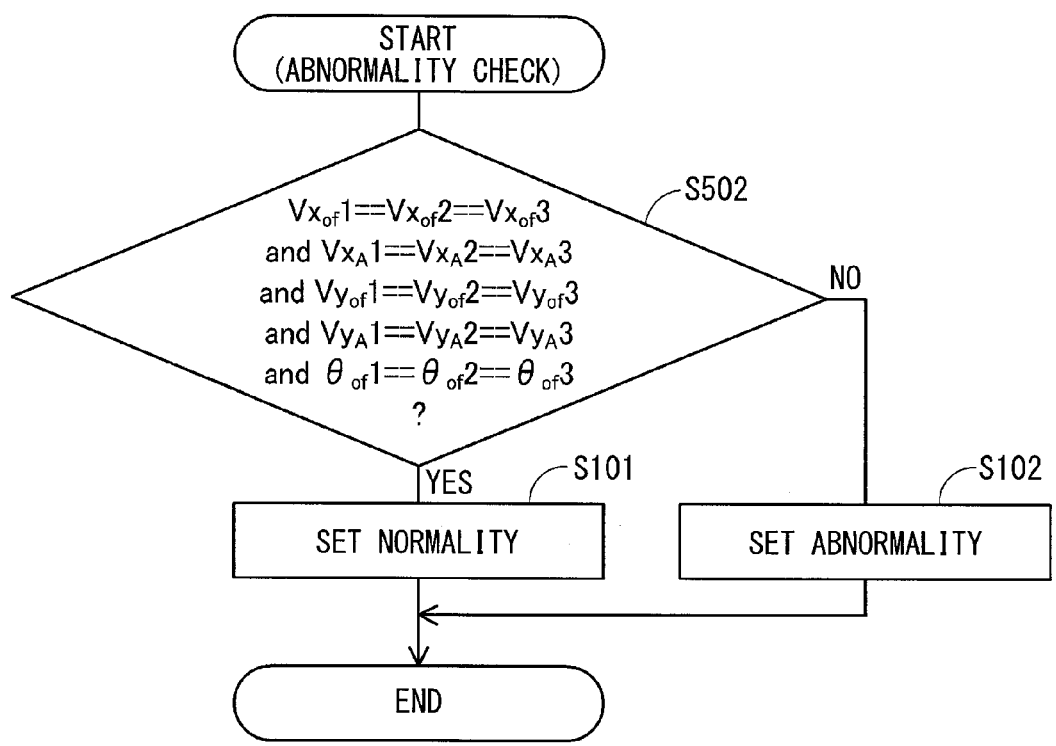
FIG. 16 is a flowchart of correction value abnormality checking performed by a correction value abnormality checking section of an AC rotary electric machine control apparatus according to a third embodiment.

According to a third embodiment, as shown in FIG. 16, the correction value abnormality check section 47 checks the abnormality of the correction value set by using a method different from that shown in FIG. 14. That is, the set of correction values Vxof, VxA, Vyof, VyA and θof is stored in different storage locations (plural storage areas) and the correction value set is determined to be abnormal if the correction value set stored in different storage locations do not agree. The different storage locations may be provided in the ROM 66 or in different ROMs.

FIG. 16 shows an abnormality check method in a case that the correction value set of Vxof, VxA, Vyof, VyA and θof is stored in different locations (first, second and third storage areas). At S502, the numbers 1, 2 and 3 attached to the end of each correction value (for example, Vxof) indicates the storage area among the first, second and third storage areas, in which the correction value is stored. S502 determines YES only when each of the set of correction values Vxof, VxA, Vyof, VyA and θof stored in the first to the third storage areas agree. The flag is set to normality at S101. S502 determines NO when any one of the set of correction values Vxof, VxA, Vyof, VyA and θof stored in the first to the third storage areas is different. The flag is set to abnormality at S101.

However, when at least two of the correction values (Vxof1 and Vxof2) stored in different locations agree with respect to each correction item (for example, Vxof), the correction value in agreement may be used as the true correction value without setting the flag to be abnormal. It is also possible further to retrieve the correction value stored in the storage area at one location plural times and check whether the retrieved correction values are normal or abnormal by comparing the retrieved correction values.

Other Embodiment (A) In the above-described embodiments, the current command value calculation section 30 sets the d-axis current command value Id* to zero when the correction value is abnormal. The current command phase φ is set to be most remote from 0[°] and 180[°] thereby to ensure the maximum tolerable range relative to the rotation position error. However, when the correction value is abnormal, the d-axis current command value id* need not be set to zero but may be varied toward zero than the value of the time the correction value is normal. The tolerable range relative to the rotation position error can be widened.

(B) The power supply control for the motor 80 by the control unit 65 is not limited to the current feedback control as performed in the above-described embodiments. It may be performed by feedforward control based on, for example, a current command value, an electrical angular velocity, specifications of various devices and the like.

(C) The positions of the current detection elements for detecting the phase currents are not limited to the locations set in the above-described embodiments. The current detection elements need not be provided if the current feedback control is not adopted.

(D) The inverter 60 is not limited to that of FIG. 1. For example, the switching element may be a field effect transistor (FET) other than the MOSFET or IGBT. The drive method of the inverter 60 is not limited to PWM (pulse-width modulation) control.

(E) The calculation of the d-axis current command reference value in correspondence to a value reflecting the motor rotation speed in the weak magnetic field control is not limited to those of the above-described embodiments, in which the modulation rate mod or the electrical angular velocity w are acquired. The d-axis current command reference value may be calculated based on other values.

(F) The AC rotary electric machine, which is controlled by the rotary electric machine control apparatus according to the embodiments, is not limited to the motor of the permanent magnet synchronous type, but may be an induction motor, other synchronous motor or a generator. The system, to which the rotary electric machine is applied, is not limited to the electric power steering apparatus.

(G) The correction value information and the default value information, each of which is formed of plural correction values and plural default values, may be formed of one correction value and one default value, respectively.

What is claimed is:

1. A control apparatus for a rotary electric machine to which a rotation position sensor is assembled for detecting a rotation position of the rotary electric machine, the control apparatus comprising:
   a power converter for converting input power and supplying converted power to the rotary electric machine; and
   a control unit for controlling power supply to the rotary electric machine,
   wherein the control unit includes
   a storage section for storing correction value information and default value information, the correction value information being specific to individual assembly according to an initial error caused in assembling the rotation position sensor with the rotary electric machine, and default value information being limited so that a difference from the correction value information is within a predetermined range,
   a rotation position calculation section for correcting a detection signal of the rotation position sensor by using the correction value information or the default value information stored in the storage section,
   a correction value abnormality check section for checking whether the correction value information is normal, and
   a current command value calculation section for calculating a current command value of a magnetic field component current and a torque component current of the rotary electric machine,
   wherein, when the correction value information is normal, the rotation position calculation section corrects the detection signal of the rotation position sensor based on the correction value information,
   wherein, when the correction value information is abnormal, the rotation position calculation section corrects the detection signal of the rotation position sensor based on the default value information, and the current command value calculation section calculates the current command value so that the magnetic field component current supplied to the rotary electric machine is closer to zero than when the correction value information is normal.

2. The control apparatus for a rotary electric machine according to claim 1, wherein:
the control unit controls phase currents supplied to the AC rotary electric machine by converting into a d-axis current corresponding to the magnetic field component current and a q-axis current corresponding to the torque component current; and
the current command value calculation section makes the d-axis current command value to be closer to zero when the correction value information is abnormal than when the correction value information is normal.

3. The control apparatus according to claim 2, wherein:
when the correction value information is abnormal, the current command value calculation section makes the d-axis command value to be zero.

4. The control apparatus according to claim 2, wherein:
the rotary electric machine is a permanent magnet synchronous motor, which generates reluctance torque;
when the correction value information is normal, the current command value calculation section calculates the d-axis current command value and the q-axis current command value of a current command vector on a d-q coordinate to generate maximum torque with a minimum current; and
when the correction value information is abnormal, the current command value calculation section sets the d-axis current command value to zero and calculates the q-axis current command value based on the torque command value.

5. The control apparatus according to claim 2, wherein:
when the correction value information is normal, the current command value calculation section calculates the d-axis current command value and the q-axis current command value of a current command vector on a d-q coordinate to generate maximum torque with a minimum current with reference to a first data map and a second data map together with the torque command value, respectively, the first data map defining a relation of the d-axis current command value relative to the torque command value and the second data map defining a relation of the q-axis current command value relative to the d-axis current command value; and
when the correction value information is abnormal, the current command value calculation section sets the d-axis current command value to zero and calculates the q-axis current command value based on the torque command value.

6. The control apparatus according to claim 5, wherein:
the current command value calculation section includes a minimum current selection section for selecting the d-axis current command value, which is negative and minimum among inputted plural d-axis current command values; and
the minimum d-axis current selection section selects, in calculating the d-axis current command value when the correction value information is normal, the d-axis current command value, which is a smaller one of the d-axis current command reference value and the d-axis current command data map value, the d-axis current command reference value being calculated based on a modulation rate of a voltage applied to the power converter for weak magnetic field control, and the d-axis current command data map value being calculated with reference to the first data map.

7. The control apparatus according to claim 5, wherein:
the current command value calculation section includes a minimum current selection section for selecting the d-axis current command value, which is negative and minimum among inputted plural d-axis current command values; and
the minimum d-axis current selection section selects, in calculating the d-axis current command value when the correction value information is normal, the d-axis current command value, which is a smaller one of the d-axis current command reference value and the d-axis current command data map value, the d-axis current command value being calculated based on the q-axis current calculation value determined by d-q conversion of the phase current detection value and an electrical angular velocity of the rotary electric machine for weak magnetic field control, and the d-axis current command value being calculated with reference to the first data map.

8. The control apparatus according to claim 1, wherein:
the storage section stores a set of correction values as the correction value information; and
the correction value abnormality check section determines that the correction value information is abnormal when any one of the correction values is outside a predetermined range.

9. The control apparatus according to any claim 1, wherein:
the storage section stores the correction value information in different storage locations; and
the correction value abnormality check section determines that the correction value information is abnormal when the correction value information stored in the different storage locations differ each other.

* * * * *